Feb. 5, 1952     L. P. HODGES     2,584,269
SEPARATION OF OXYGENATED ORGANIC
COMPOUNDS FROM SYNTHETIC NAPHTHA
Filed Oct. 25, 1948
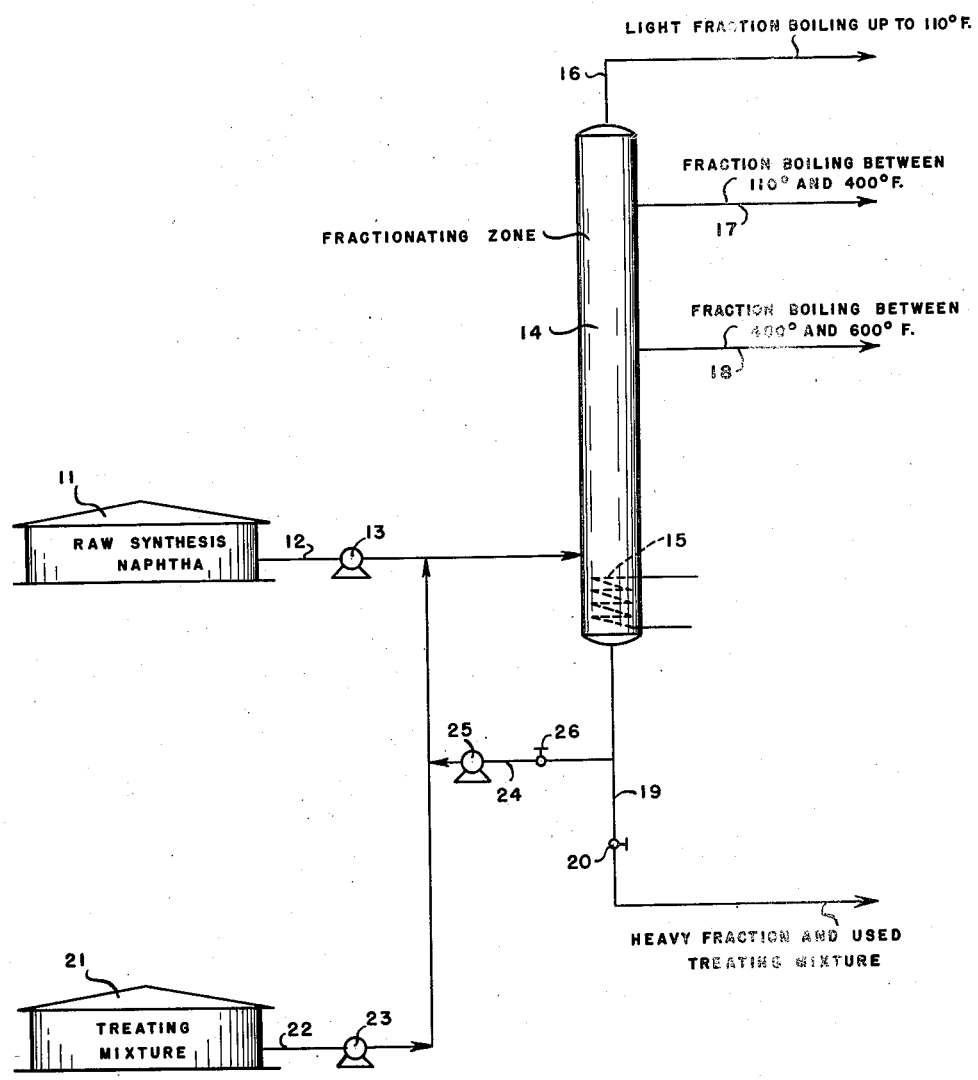

Patented Feb. 5, 1952

2,584,269

UNITED STATES PATENT OFFICE 2,584,269

SEPARATION OF OXYGENATED ORGANIC COMPOUNDS FROM SYNTHETIC NAPHTHA

Linnie P. Hodges, Baytown, Tex., assignor, by mesne assignments, to Standard Oil Development Company, Elizabeth, N. J., a corporation of Delaware Application October 25, 1948, Serial No. 56,448

4 Claims. (Cl. 260—450)

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of less attractive nature than the product resulting from the catalytic conversion of the hydrocarbons themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalysts to cause the reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents, such as sulfur dioxide and the like and mixtures thereof. It has also been suggested to remove a portion of the oxygenated organic compounds by treatment of the naphtha with various chemical reagents. The prior art proposals have largely been unsatisfactory in that, while they are effective in removing a portion of the oxygenated organic contaminants in the naphtha, they are largely ineffective in substantially completely removing the oxygenated organic compounds.

It has now been discovered that the oxygenated organic compounds contained in hydrocarbons may be substantially reduced in quantity by distilling the contaminated hydrocarbon containing these materials over a treating reagent comprising a mixture of alkali metal naphthenates, oil, and alkali metal hydroxide. This treatment serves to remove substantially all of the oxygenated organic compounds from the hydrocarbons and it is particularly effective in removing ketones which usually resist most treating procedures.

It is, therefore, the main object of the present invention to provide a process for removing oxygenated organic compounds from naphthas containing them by distilling the naphtha in contact with a mixture of alkali metal naphthenates, oil, and alkali metal hydroxide.

Another object of the present invention is to provide a method for treating hydrocarbons containing oxygenated organic compounds as contaminants and olefins whereby the content of oxygenated organic compounds is substantially reduced and the hydrocarbons including the olefins are made suitable for employment in catalytic conversion operations.

A further object of the present invention is to disclose a process whereby a hydrocarbon mixture containing the various olefins and oxygenated organic compounds including ketones is treated such that the content of oxygenated organic compounds including ketones is substantially reduced and the olefins made suitable as a feed for producing synthetic lubricant polymers.

The objects of the present invention are attained by subjecting hydrocarbons, such as a synthetic crude petroleum obtained by the reaction of carbon monoxide and hydrogen, to a distillation operation in the presence of a treating mixture including oil, an alkali metal naphthenate, and an alkali metal hydroxide under conditions to cause substantial removal of oxygenated organic compounds and to segregate fractions boiling in the gasoline and higher boiling ranges which are suitable for catalytic conversion operations.

The objects of the present invention may also be attained by subjecting a synthetic crude petroleum to distillation in the presence of a mixture including alkali metal naphthenate and alkali metal hydroxide, the presence of oil in the mixture being optional but preferred for ease of contact and for handling of the treating reagent.

The treating mixture employed in the present invention will usually comprise alkali metal naphthenates, oil, and alkali metal hydroxide. A mixture of alkali metal naphthenates and oil may be obtained by subjecting a petroleum fraction in the lubricating oil boiling range containing naphthenic acids to distillation in the presence of a strong aqueous solution of alkali metal hydroxide such as sodium hydroxide. Under conditions of distillation of the luricating oil fraction containing naphthenic acid, the alkali metal hydroxide reacts with the naphthenic acids to form the corresponding alkali metal naphthenates which may be recovered as such as a viscous solution in the residual oil fraction. Such a residual fraction from the distillation of a Coastal crude petroleum may contain approximately 97% by weight oil and approximately 3% by weight sodium naphthenates. However, the amount of alkali metal naphthenate and oil in the treating mixture prior to the addition of the alkali metal hydroxide may vary from less than 1% by weight up to about 10% by weight and will usually approximate 3% by weight. To this mixture may then be added an amount of an alkali metal hydroxide in the range from about 10% to 50% by weight based on the total admixture. The alkali metal hydroxide will usually be present in the treating reagent in the amount of about 20% by weight.

The oil employed as a component of the treating reagent may be a lubricating oil fraction or may be a heavy residual fraction of petroleum. Under some conditions, it may be desirable to employ pure sodium naphthenates and to compound the treating reagent with a solvent extract of a lubricating oil fraction. Under these conditions, sodium naphthenates in the desired amount will be added to the solvent extract of a lubricating oil fraction and to the resulting admixture will be added alkali metal hydroxide in an amount in the range given. The boiling point of the oil should be above 600° F. so that the fractions of desired boiling point may be easily separated therefrom.

The alkali metal hydroxide employed in the practice of the present invention is preferably sodium hydroxide, but potassium and lithium hydroxides may be substituted therefor. Sodium hydroxide is more available than the other alkali metal hydroxides and, consequently, will find wider usage. Similarly, the alkali metal naphthenate is preferably the sodium naphthenates, but like the alkali metal hydroxides, potassium and lithium naphthenates and under some conditions ammonium naphthenates may be satisfactorily employed in the practice of my invention.

The naphthenates, as mentioned before, may be recovered from petroleum fractions containing naphthenic acids which is the usual source of these compounds. Particularly, the California crude petroleums, those from the Coastal United States fields and from Russian crude oils contain appreciable amounts of naphthenic acids which may be recovered in the form of the alkali metal salts by contact therewith. The naphthenates finding usage in the practice of the present invention will usually be derived from the naphthenic acids formed from the naphthene hydrocarbons and may range from compounds having 7 up to about 30 carbon atoms. The content of naphthenic acid of crude petroleum varies with the source. Some crude oils contain as much as 2% of naphthenic acid.

Naphthenic acids may be represented by the empirical formula $C_nH_{2n-1}COOH$ where $n$ indicates the number of carbon atoms. The specific gravity of the naphthenic acids usually is less than 1 and they are characterized by an outstanding foul odor.

A mixture of sodium naphthenates and oil obtained by distilling naphthenic acid-containing petroleum over alkali metal hydroxide, as stated before, may result in a mixture containing approximately 3% by weight of sodium naphthenates and approximately 97% by weight of oil. To this mixture is added an amount of alkali metal hydroxide in the treating reagent in the range between 10 and 50% by weight of the mixture. A treating reagent which gives good results in removing oxygenated organic compounds from petroleum fractions containing them may comprise 20% by weight sodium hydroxide and 80% by weight of a mixture of 97% by weight of oil and 3% by weight of sodium naphthenates.

The invention will now be illustrated by reference to the drawing in which the sole figure presents a flow sheet of a preferred mode of practicing the invention.

Referring now to the drawing, numeral 11 designates a charge tank containing a hydrocarbon fraction such as a raw synthesis naphtha obtained as the hydrocarbon product from the synthesis of carbon monoxide and hydrogen over an iron catalyst. This fraction is pumped into the system from tank 11 by line 12 and pump 13 which discharges the hydrocarbon feed into a fractionation zone 14. Fractionation zone 14 is provided with a heating means 15 which is illustrated by a coil. This heating means is employed to adjust temperatures and pressures in zone 14. Fractionation zone 14 is shown as a single distillation tower, but it is understood that it may include a series of fractional distillation towers. It is also understood that distillation zone 14 will be provided with internal baffling equipment, such as bell cap trays or other internal equipment, to provide intimate contact between vapors and liquids.

Fractionation zone 14 is also provided with a line 16 to remove light fractions boiling up to about 110° F., line 17 by way of which a fraction boiling between 110° and 400° F. may be obtained, line 18 for removal of a fraction boiling between 400° and 600° F., and line 19 controlled by valve 20 by way of which the heavy fractions and the treating mixture, which will be described further, may be withdrawn from the system.

The raw feed naphtha introduced into fractionation zone 14 by line 12 and pump 13 has admixed with it an amount of the treating mixture sufficient to treat the oxygenated organic compounds contained in the raw synthesis naphtha and to cause removal thereof. Usually raw synthesis naphthas, produced by the reaction of carbon monoxide and hydrogen over an iron catalyst will contain in the neighborhood of 20 weight per cent of oxygenated organic compounds. To treat this content of oxygenated organic compounds, an amount of treating mixture in the range from about 5 to about 30 volume per cent may be employed. This will depend on the content of oxygenated organic compounds in the raw naphtha and this content will vary with the catalyst employed and the conversion conditions under which the naphtha is produced. The treating mixture is contained in tank 21 and is injected into the system by line 22 and pump 23 which allows the continuous injection of the treating mixture. The treating mixture in tank 21 will comprise a mixture of a residual crude petroleum, petroleum sodium naphthenates, and sodium hydroxide in the amounts given above.

The heavy fractions plus used treating mixture, withdrawn from fractionation zone 14 by line 19, may be recycled in part to line 22 by branch line 24 controlled by valve 26 and containing pump 25. Valve 26 may be adjusted to provide the proper ratio of the used treating mixture and the fresh treating mixture so that the oxygenated organic compounds may be removed from the raw naphtha with greatest efficiency.

The heavy fractions and used treating mixture not recycled in the process may be withdrawn from the system by manipulation of valve 20 in line 19. This fraction will contain useful hydrocarbons, oxygenated organic compounds dissolved in the treating reagent and the used treating reagent. To recover the valuable constituents contained therein, it may be desirable to dilute this fraction after cooling in suitable cooling means, not shown, with water or an aqueous solution to cause the formation of a hydrocarbon layer and an aqueous layer. The hydrocarbon layer and the aqueous layer are separable by gravity from each other. The hydrocarbon layer may be further used if desired while a substantial amount of the oxygenated organic compounds containing the aqueous layer may be recovered therefrom by acidification with a mineral acid.

Under some conditions, rather than dilute the fraction withdrawn from zone 14 by line 19 with water, it may be desirable to dilute this fraction with a heavy aromatic hydrocarbon such as a solvent extract of a lubricating oil fraction, particularly when the sodium naphthenates are obtained in admixture with heavy residual crude fractions. It may be desirable also to recycle a portion of the heavy fraction diluted with water or with the heavy aromatic fraction to the treating zone. In fact, dilution either with water or with a heavy aromatic fraction may be beneficial in removing oxygenated compounds from the synthetic naphtha.

It will be seen from the foregoing description that a simple distillation process including a treating operation has been described wherein a contaminated hydrocarbon containing oxygenated organic compounds is subjected to distillation in the presence of a treating reagent comprising oil, alkali metal naphthenates, and alkali metal hydroxide to obtain an overhead fraction, substantially free of contaminants, which is useful in catalytic conversion operations.

The invention will now be further illustrated by specific runs in which a naphtha formed by the reaction of carbon monoxide and hydrogen over an iron-type catalyst was divided into five portions. One portion was subjected to distillation as is to recover fractions boiling between 110° and 400° F. and between 400° and 600° F. A second portion was treated with sodium hydroxide solution in an amount of 50 volume per cent. The sodium hydroxide solution had a strength of 5° Bé. The second portion, after separation from the caustic solution, was subjected to distillation conditions under comparable conditions to those used for the first portion to obtain fractions boiling between 110° and 400° F. and between 400° and 600° F.

The third portion was treated in accordance with the present invention in that a mixture containing oil and sodium naphthenate to which had been added 20 weight per cent sodium hydroxide was added to it. Ten volume per cent of this mixture was added to the naphtha and the naphtha distilled under comparable conditions to those used in the other runs to obtain fractions having similar boiling ranges. In the next run the naphtha was distilled over 33 volume per cent of a solution of 50° Bé. sodium hydroxide to obtain a single fraction boiling between 110° and 400° F.

The fractions having the aforementioned boiling ranges were subjected to analysis for oxygenated organic compounds with the results reported in the following table:

*Table*

| Treatment | None | | Washed with NaOH and then distilled | | Distilled in presence of— | | |
|---|---|---|---|---|---|---|---|
| | | | | | Oil, Sodium Naphthenates, NaOH | | 50° Bé. NaOH |
| Boiling range, °F | 110–400 | 400–600 | 110–400 | 400–600 | 110–400 | 400–600 | 110–400 |
| Yield, Vol. Per Cent | 61.4 | 12.0 | | | 59.7 | 11.2 | |
| Analysis—Oxygenated Organic Compounds weight per cent (expressed as functional group): | | | | | | | |
| OH (alcohols) | 0.93 | 0.27 | 0.40 | 0.50 | 0.83 | 0.00 | 1.12 |
| CHO (aldehydes) | 0.62 | 0.15 | 0.82 | 0.33 | 0.00 | 0.00 | 0.00 |
| COOH (acids) | 0.92 | 0.47 | 0.00 | 0.00 | 0.00 | 0.00 | 0.00 |
| COO (esters) | 0.64 | 3.38 | 0.39 | 0.31 | 0.04 | 0.00 | 0.00 |
| CO (ketones) | 1.13 | 0.27 | 1.33 | 0.91 | 0.43 | 0.05 | 0.55 |

It will be seen from the foregoing data that distillation of the naphtha over the mixture of oil, sodium naphthenates, and sodium hydroxide resulted in complete reduction of the content of aldehydes and organic acids, and practically complete reduction of the esters content. It will also be noted that the ketones have been substantially completely removed by treatment with the reagent employed in the present invention. The amount of alcohols remaining after the treatment with the reagent in accordance with the present invention is not disadvantageous since alcohols may be easily extracted with aqueous methanol.

Although it is preferred to employ a treating reagent comprising oil, sodium naphthenates, and sodium hydroxide, under some conditions, the oil may be omitted and an admixture of alkali metal naphthenates and alkali metal hydroxide used as a treating reagent. In these circumstances, the relative amounts of the alkali metal naphthenates and alkali metal hydroxides will be in the range given above. When oil is omitted from the treating reagent, the heavier fractions of the hydrocarbons being treated will serve to carry the mixture of alkali metal naphthenate and alkali metal hydroxide.

The nature and objects of the present invention having been completely described and illustrated, what I wish to claim as new and useful and to secure by Letters Patent is:

1. A method for removing oxygenated organic compounds from a raw-naphtha obtained from the synthesis of carbon monoxide and hydrogen over an iron catalyst containing approximately 20 wt. per cent oxygenated organic compounds including ketones, aldehydes, carboxylic acids and esters which comprises admixing the hydrocarbon fraction from the synthesis of carbon monoxide and hydrogen over an iron catalyst with a treating reagent comprising a hydrocarbon fraction boiling in the lubricating oil boiling range, an alkali metal naphthenate, and an alkali metal hydroxide, subjecting the admixture to distillation conditions and recovering from said distillation a fraction boiling in the gasoline boiling range substantially free of said oxygenated organic compounds.

2. A method in accordance with claim 1 in which the hydrocarbon fraction is admixed with an amount of the treating reagent in the range from about 5 to about 30 volume per cent.

3. A method in accordance with claim 1 in which the fraction boiling in the lubricating oil boiling range is a solvent extract of a lubricating oil fraction, the alkali metal naphthenate is sodium naphthenate, and the alkali metal hydroxide is sodium hydroxide.

4. A method in accordance with claim 1 in which the treating reagent comprises 90% to 99% by weight of a hydrocarbon fraction boiling above 600° F., 1% to 10% of an alkali metal naphthenate to which has been added an amount of an alkali metal hydroxide sufficient to provide in said treating reagent an amount of alkali metal hydroxide in the range between 10% and 50% by weight.

LINNIE P. HODGES.

REFERENCES CITED

The following references are of record in the file of this patent:

UNITED STATES PATENTS

| Number | Name | Date |
|---|---|---|
| 2,025,766 | Mead | Dec. 31, 1935 |
| 2,068,979 | Fisher | Jan. 26, 1937 |
| 2,455,679 | Jones et al. | Dec. 7, 1948 |
| 2,497,967 | Wadley | Feb. 21, 1950 |

OTHER REFERENCES

Yule et al., Ind. and Eng. Chem., vol. 23, No. 11, pages 1254–8 (1931).

"The Science of Petroleum," Dunstan et al., vol. III, page 1716, Oxford University Press, N. Y. (1938).